Sept. 21, 1965  L. P. WHALLON ETAL  3,207,325
CAN–HANDLING APPARATUS

Filed Dec. 26, 1962  6 Sheets-Sheet 1

Inventors:
Lester P. Whallon,
William M. Myers,
by Hood, Gust & Irish
Attorneys.

Inventors:
Lester P. Whallon,
William M. Myers,
by Hood, Gust & Irish
Attorneys.

United States Patent Office 3,207,325
Patented Sept. 21, 1965

3,207,325
CAN-HANDLING APPARATUS
Lester P. Whallon, Huntington, and William M. Myers, Markle, Ind., assignors to Industrial Machines, Inc., Huntington, Ind., a corporation of Indiana
Filed Dec. 26, 1962, Ser. No. 246,938
20 Claims. (Cl. 214—1)

The present invention relates to can-handling apparatus and more particularly to apparatus which is capable of both elevational and rotary movement whereby a plurality of cans or similar type containers may be picked up, elevated to a desired height, swung to a desired position, and then deposited on a particular surface.

It is conventional to package goods and products of varying kinds and properties in containers of glass, plastic, tin and the like. So-called tin cans, which in many instances are composed of sheet steel which is tin plated, are conventionally used for the purpose of packaging food, chemicals, petroleum and the like. These cans are cylindrical in shape and have flat closures on the ends and in a great many instances these closures have undulations or reinforcing ribs for purposes which are well known.

Assuming for purposes of illustration that food is to be packaged in tin cans, this operation is performed in a packaging plant by the use of suitable machinery. After filling, the cans are conveyed into storage areas or warehouses where the cans are arranged in multiple layers and are stacked on wooden or the like pallets which may be handled by fork-lift trucks. The reason for stacking the cans is to conserve floor area, such that when a storage area or warehouse is filled, the cans will reach from the floor to a considerable height toward the ceiling.

Following this warehousing, it is sometimes the practice to remove the cans for the purpose of packaging them into individual cardboard or the like boxes, and in performing this operation it is conventional to convey a pallet full of cans to a packaging area where workers manually remove the cans from the stack and transfer them to cardboard boxes. This manual operation, of course, is a tedious and time-consuming operation since the cans must be individually handled and moved to a location where the packaging is to take place and thereafter again individually handled and placed into the boxes.

In accordance with the present invention, it is an object to provide a machine or apparatus which is capable of lifting an entire layer of cans off a stack to a desired height, then swing this entire layer of cans horizontally to a given position, and then deposit the cans onto a surface or into a container or the like.

It is another object of this invention to provide a machine or apparatus which utilizes a plurality of horizontally arranged and spaced rubber suction cups which are operable to pick up an entire layer of cans and move this layer to a given elevational and rotational position for further handling.

It is yet another object of this invention to provide unique apparatus for picking up and depositing cans and other similar objects in a reliable, efficient and economical manner.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
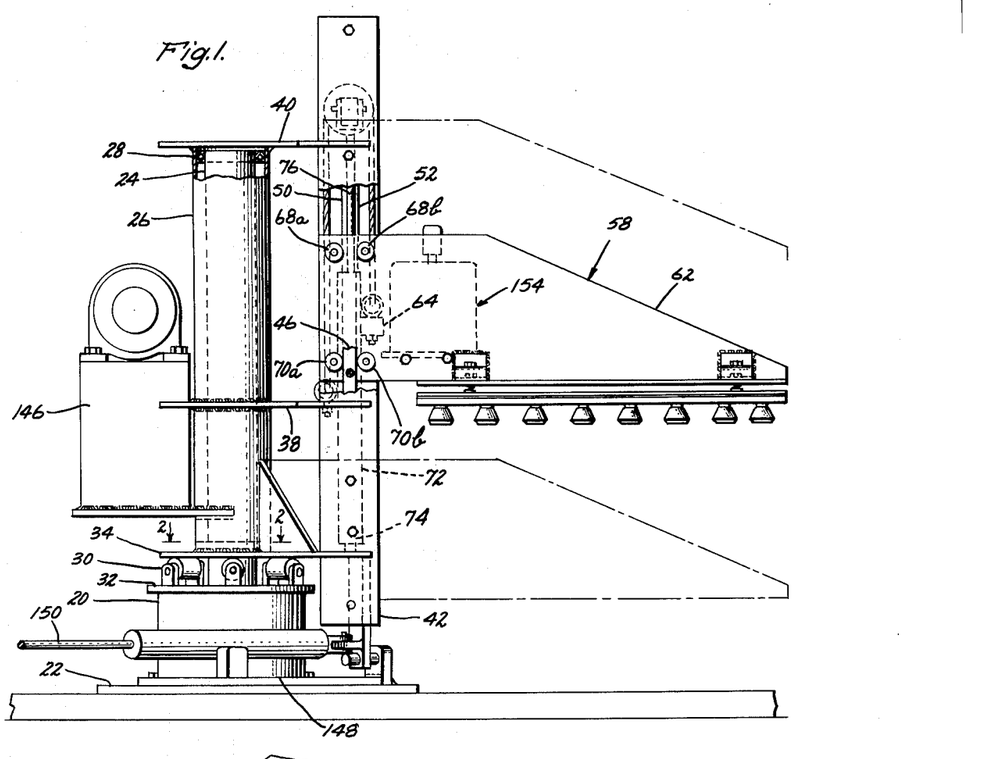
FIG. 1 is a side elevation of one embodiment of this invention.
Figure 2:
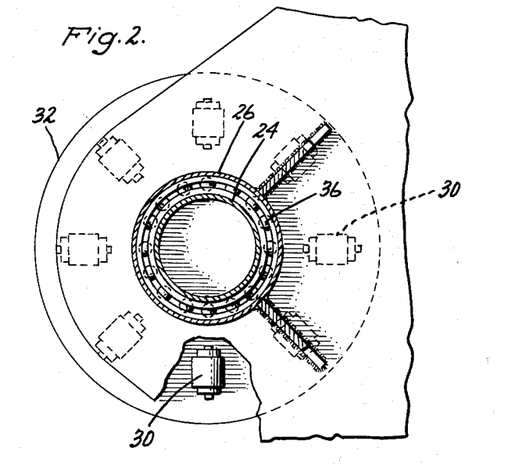
FIG. 2 is a fragmentary cross-sectional illustration taken substantially along section line 2—2 of FIG. 1.

Referring to the drawings, and more particularly to FIGS. 1–6, the apparatus comprises an upstanding, stationary base 20 which either may rest on a floor surface or be secured to a suitable plate 22 which in turn may rest on a floor surface. Secured to and upstanding from the stationary base 20 is a stationary, cylindrically shaped post 24 having substantial strength as will be apparent from the description to follow. Telescoped over this post 24 and coaxial therewith is a cylindrical or tubular column 26. This column 26 is rotatable about an axis coincident with the axis of the post 24, a suitable bearing assembly 28 fitting between the upper ends of the post 24 and column 26 for this purpose. Further rotationally supporting the column 26 are a circumferential series of rollers 30 (FIG. 2) which are mounted on the upper, horizontal surface 32 of the base 20 for rotation about horizontal axes, a flat, horizontally extending plate 34 (FIG. 1) which is secured by welding or the like to the lower end of the column 26 resting on these rollers 30. Also, another ball bearing assembly 36 is coaxially interposed between the lower end of the column 26 and post 24 (FIG. 2). By means of the mounting just described, the column 26 is capable of rotating on the post 24.

In addition to the bearing plate 34 (FIG. 1), two other flat, horizontal steel plates 38 and 40 which are vertically spaced apart and parallel are secured by welding or the like to the column 26. The plate 38 is secured to the column 26 at a suitable location between the ends thereof while the plate 40 is mounted on the top thereof.

Figure 3:
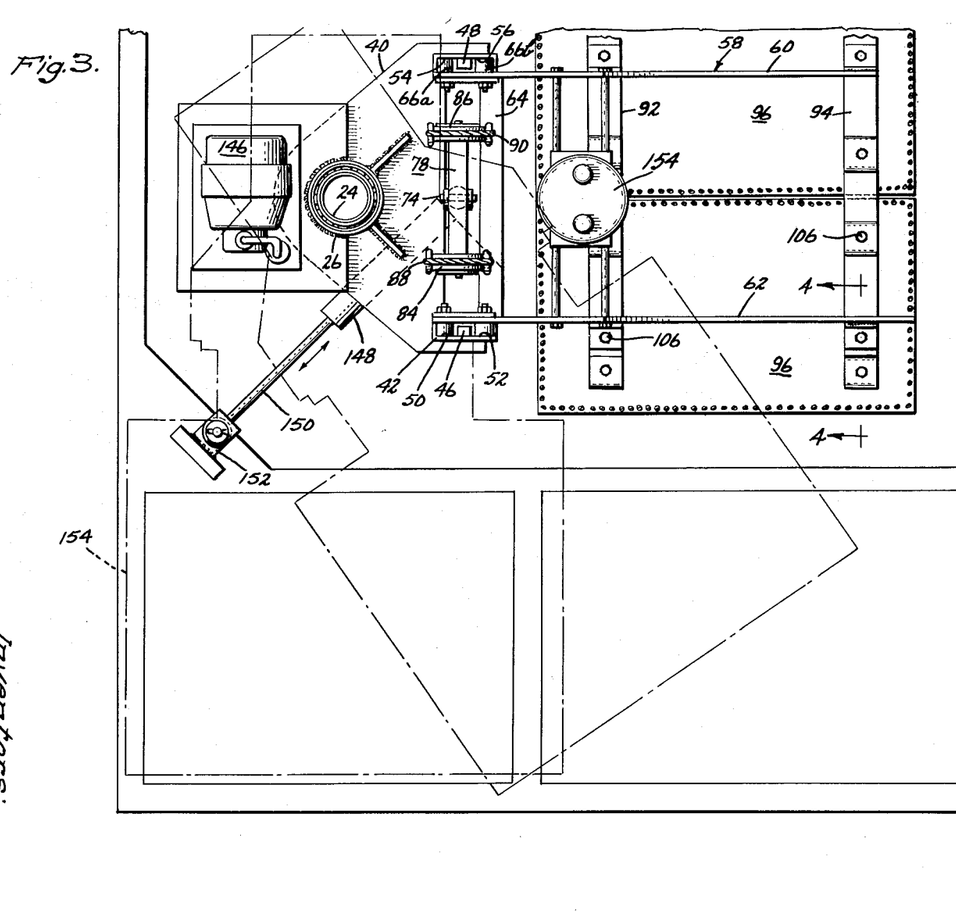
FIG. 3 is a partial top plan view of the embodiment of FIG. 1.

As shown in FIGS. 1, 3, 5 and 6, there are two elongated, upright guide members 42 and 44 which are spaced apart and parallel. In the particular working embodiment of the invention as illustrated, these guide members 42 and 44 are steel channels having the interiors thereof, as shown in FIG. 3, facing each other. These channels 42 and 44 are welded or otherwise secured to the three plates 34, 38 and 40 on the column 26 so they can rotate with the column 26.

Secured to the inner webs of the channels 42 and 44 are two elongated steel bars 46 and 48, respectively, which are square in cross-section, as shown in FIG. 3, and which are vertically arranged and spaced inwardly from the lateral edges of the channels 42 and 44. This provides two grooves or tracks 50 and 52 in the channel 42 and 54 and 56 in the channel 44. These tracks serve a purpose which will be explained later on.

An elevator assembly is indicated by the general reference numeral 58 and will now be described. This assembly comprises two steel plates 60 and 62 which are spaced apart and parallel and arranged in vertical planes. As shown more clearly in FIG. 1, these plates have an elongated, somewhat triangular shape and extend forwardly or to the right from the guide members 42 and 44. Rigidly securing these plates 60 and 62 together is a horizontal steel bar 64 welded at its opposite ends to the two plates. This bar 64 extends between the two guide members 42 and 44 as more clearly shown in FIG. 3 such that it is in substantial alignment with the two tracks 52 and 56 thereof.

On the laterally outer sides of each of the two plates 60 and 62 are mounted four rollers arranged in two vertically spaced pairs, the plate 60 having rollers 66a and 66b horizontally spaced and engaging the two tracks 54 and 56 of the guide member 54 and two additional rollers (not shown) horizontally spaced apart and located downwardly from the rollers 66a and 66b which are also fitted into, respectively, the two tracks 54 and 56.

Similarly, and as more clearly shown in FIG. 1, the plate 62 has two rollers 68a and 68b fitted into the two tracks 50 and 52 of the guide member 42 and two other rollers 70a and 70b which are horizontally spaced apart and fitted into the tracks 50 and 52, respectively. The roller pairs 68a, 68b and 70a, 70b are vertically spaced apart and are otherwise dimensioned such as to engage the opposite sides, respectively, of the track bar 46.

By means of all these rollers, the elevator assembly 58 is capable of moving vertically on the guide members 42 and 44, and because of the vertical spacing between the rollers, the elevator assembly is held in the illustrated cantilever position of FIG. 1.

For moving the elevator assembly 58 vertically, a hydraulic power cylinder is provided, this cylinder being indicated by the numeral 72. The lower end of the cylinder 72 is mounted on the front portion of the bearing plate 34 by means of a pivot pin 74 which is horizontal and tangential with respect to the axis of rotation of the column 26. By this means, the cylinder 72 is free to swing in a vertical plane toward and away from the column 26. This cylinder 72 carries the usual reciprocable piston therein to which is secured an axially extending connecting rod 76 which projects upwardly. A horizontal, steel beam 78 which extends in a direction from one guide member 42 to the other guide member 44 is fastened intermediate its ends to the upper end of the rod 76 by means of a clevis 80 and pivot pin 82. This pivot pin 82 is horizontal and extends in a direction substantially normal to the axis of the rotary column 26 such that the bar or beam 78 can swing to a limited extent, in a vertical plane, thereabout. This beam 78 carries on its opposite ends for rotation about horizontal axes two pulleys 84 and 86, respectively. While pulleys per se have been illustrated and described, it should be understood that sprockets may be used instead without departing from the scope of this invention. Any time pulleys and cables are mentioned hereinafter, the full equivalent of sprockets and chains are intended to be included therein.

Passed over these two pulleys 84 and 86 are two cables 88 and 90 which are secured at one end to the plate 38 and at the other end to the bar 64 as shown. Thus, as the power cylinder 72 is actuated, the pulleys 84 and 86 will be correspondingly raised or lowered to thereby elevate or depress, as the case may be, the elevator assembly 58.

Figure 4:
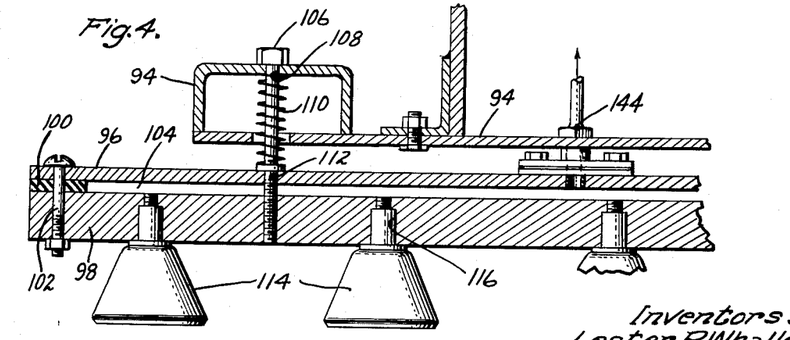
FIG. 4 is a fragmentary sectional illustration taken substantially along the section line 4—4 of FIG. 3.
Figure 6:
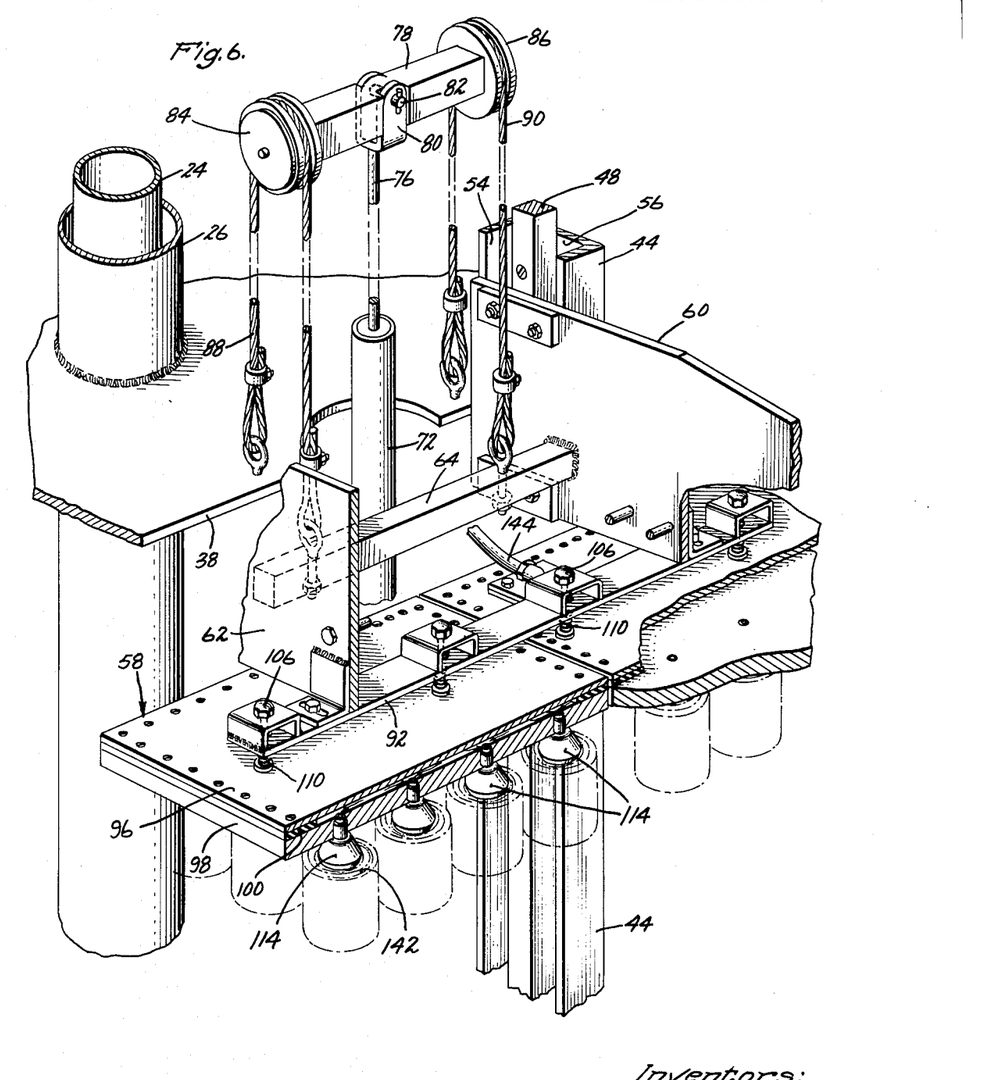
FIG. 6 is a perspective illustration of a portion of the apparatus of FIG. 1 sectioned and broken away in part for clarity of ilustration.

Continuing with the description of the elevator assembly 58, as more clearly shown in FIGS. 3 and 6, two flat and parallel suspension bars 92 and 94, which preferably are made of steel, are secured to the bottom horizontal edges of the two plates 60 and 62 as shown. Suspended from these two bars 92 and 94 is a lift-plate assembly composed of upper and lower plates 96 and 98 which preferably are in the form of sheet steel and are otherwise arranged horizontally. These two plates 96 and 98, as more clearly shown in FIG. 4, are spaced apart and receive therebetween around the marginal edge portions thereof a rubber or the like gasket 100. A suitable number of bolts 102 passing through the gasket 100 and also the plates 96 and 98 serve to secure this assembly together. The plates 96 and 98 as well as the mounting of the gasket 100 are arranged such as to provide a hermetically sealed chamber 104 between the two plates, which serves a purpose to be explained more fully hereinafter.

Each of the suspension bars 92 and 94 have a series of spaced-apart bolts 106 passing therethrough which are threaded into the bottom plate 98, these bolts passing through clearance openings 108 in the suspension bars. Also, helical springs 110 surround the respective bolts 106 and bear at the upper ends thereof against the suspension bar 94 and at the lower ends thereof against the upper plate 96. The hole 112 in the upper plate 96 through which the respective bolt 106 passes is suitably hermetically sealed for the purpose of preserving the hermetically sealed character of the chamber 104. As more clearly shown in FIG. 4, the lift-plate assembly 96, 98 is spaced downwardly from the suspension bars 92 and 94, but are movably upwardly into engagement with the bars 92 and 94 against the force of the various springs 110.

Figure 7:
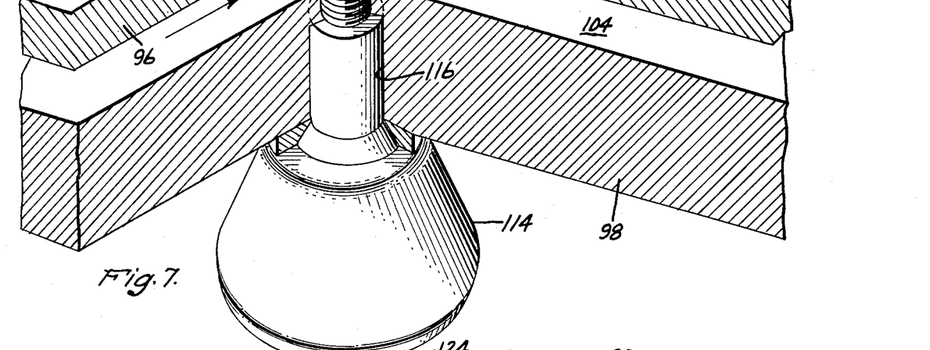
FIG. 7 is a sectional illustration of the lift-plate assembly showing the attachment of a suction cup thereto.
Figure 8:
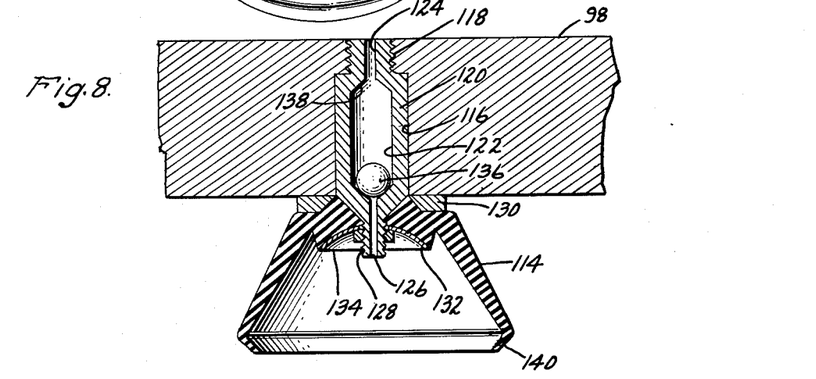
FIG. 8 is another sectional view of the structure of FIG. 7 but showing the internal construction of a valve device used in conjunction with the rubber suction cup.

The lower plate 98 has secured thereto a plurality of horizontally spaced, substantially identical rubber suction cups 114 which are shown in detail in FIGS. 7, 8, 9 and 10. As shown in FIGS. 7 and 8, the lower plate 98 is provided with a plurality of stepped diameter apertures 116 which are threaded at the upper smaller diameter ends 118 for threadedly receiving a tubular valve body 120. A barrel cavity 122 in the body 120 connects at its opposite ends to a first passage 124 which communicates with chamber 104 and a second passage 126 which communicates with the interior of the respective suction cup 114. The suction cup 114 is provided with a central aperture which fits over the reduced diameter threaded end 128 of the valve body and is clamped in place between two washers 130 and 132 by means of a nut 134 threaded onto the end 128. The washer 132 is concave as shown and the washer 130 is provided with a tapered aperture which is intimately fitted by the base portion of the suction cup 114. By means of this mounting arrangement, the suction cup 114 is not only secured in place but it is also hermetically sealed to the valve body 120.

A ball valve 136 is mounted for movement in the barrel cavity 122 and is engageable with the valve seat 138 to sever communication between the passage 124 and the cavity 122.

Figure 9:
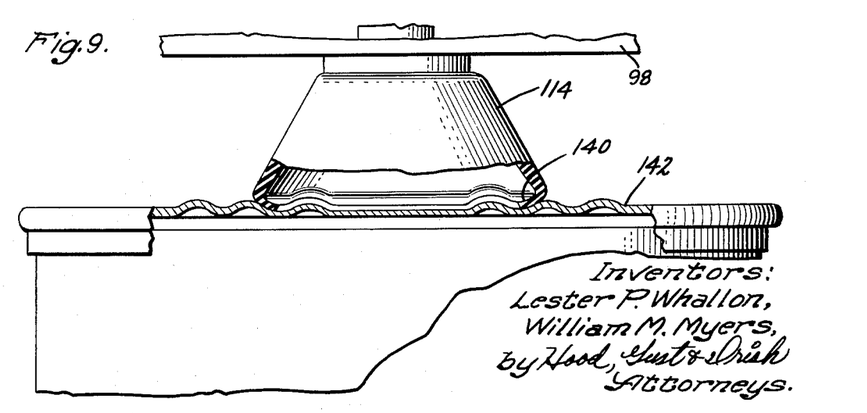
FIG. 9 is a side view, partly sectioned, of one of the suction cups of the preceding figures in attaching engagement with the cover of a typical tin can.
Figure 10:
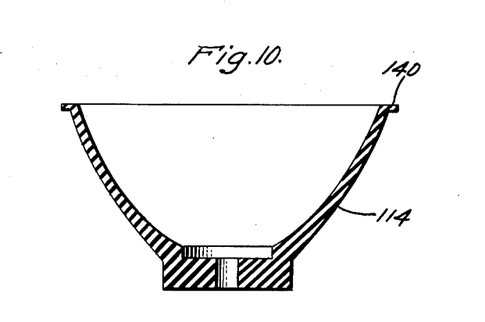
FIG. 10 is a sectional view of the rubber cup as it is initially molded.

The suction cup 114 is shaped as shown in FIGS. 7, 8 and 9 and is provided with an inwardly angled, flexible lip 140 which serves a purpose later to be explained. More specifically, the rubber from which the suction cup is formed is of 25–30 durometer, and in the initial molding thereof has the shape shown in FIG. 10. When the cup is mounted in place as shown in FIGS. 7, 8 and 9, it is turned inside-out so as to place the rubber material in tension which thereby provides the necessary characteristics of both stiffness and flexibility whereby intimate engagement between the lip 140 and the top 142 (FIG. 9) of a can may be obtained. Note in FIG. 9 that the top 142 has some annular undulations which the lip 140 can intimately engage to provide the necessary hermetic seal which will be explained more fully hereinafter.

In one mode of operation, the chamber 104 is evacuated, suitable vacuum pump connections to this chamber being provided by lines 144 (FIGS. 4 and 6).

As shown in FIGS. 1 and 3, a hydraulic pressure-developing mechanism 146 is mounted on the back side of the rotary column 26 and is provided with suitable connections and control valves which extend to the lift cylinder 72 and also to the rotary control cylinder 148. This latter cylinder 148 is connected at one end to the bearing plate 34 on the column 26, and the piston rod 150 extending therefrom is connected at its outer end to a bracket 152 (FIG. 3) which in turn is secured to the stationary supporting base. By operation of this power cylinder 148, rotary motion may be imparted to the column 26.

Mounted on the elevator assembly 58 is a suitable vacuum pump 154 (FIGS. 1, 3 and 5) having suitable lines and valves leading to the vacuum chamber 104, the connections 144 being a part thereof.

In operation, elevational movement of the elevator assembly 58 is obtained by controlling the pressure and flow of hydraulic fluid to the lift cylinder 72. When it is desired to lift the elevator 58, pressure fluid is admitted to the cylinder 72, thereby extending in an upward direction the piston rod 76 and pulleys 84 and 86 such that the cables 88 and 90 lift the elevator assembly on the guide members 42 and 44. Conversely, when it is desired to lower the elevator assembly 58, pressure fluid is allowed to flow from the power cylinder 72 thereby permitting the piston rod 76 to lower, which in turn permits the elevator assembly 58 to lower.

For the purpose of imparting rotary motion to the column 26, the power cylinder 148 is operated by the control of hydraulic fluid fed thereto. Preferably, this power cylinder 148 is double-acting such that the column 26 may be controlled in its rotation in both directions.

Assuming that it is desired to remove a stack of cans from a pallet which is moved under the elevator assembly 58 as shown in the full line positions of FIGS. 1 and 3, the power cylinder 72 is controlled such as to lower the elevator assembly 58 to a position at which the suction cups 114 engage the tops of the uppermost cans in the stack as shown in FIG. 6. By means of the spring mounting of the lift plate assembly on the suspension bars 92 and 94, all of the cans in the layer will be intimately engaged by respective suction cups 114 inasmuch as the lift-plate assembly will automatically adjust itself to the level of the can tops. Once this engagement has been obtained, further downward movement of the elevator assembly 58 is terminated, following which the vacuum pump 154 is operated such as to evacuate the chamber 104. This serves to evacuate the interiors of all of the various rubber cups, thereby fastening the same to the tops of the various cans. If it should happen that any one of the cups 14 does not seal properly against the can top or in the alternative there is no can present, the ball valve 136 (FIG. 8) will rise and seal against the seat 138 thereby sealing off this particular cup and preventing the destruction of the vacuum formed in the chamber 104.

For the next operational step, the lift cylinder 72 is operated to raise the elevator assembly 58 thereby picking up an entire layer of cans therewith. When a suitable height has been reached, the power cylinder 148 is operated to rotate the elevator assembly 58 to a position of the dashed outline 154 in FIG. 3, following which the power cylinder 72 is operated to lower the elevator assembly, if this is necessary, to a conveyor surface on which the layer of cans is to be deposited. The vacuum in the chamber 104 is thereupon released thereby resulting in the release of all the cans from the respective cups 114. The elevator assembly is next rotated to a starting position and again lowered into engagement with the next layer of cans, following which the previously described procedure is repeated. If the cans are deposited on a moving conveyor belt, it is seen that such cans are carried away as fast as they are deposited thereon from the stack.

In the stacking of cans, it is customary to separate layers with sheets of paper or the like. This means, therefore, that before the rubber cups 114 are permitted to engage the tops of the cans, this sheet of paper must be manually removed. However, this manual operation is avoided by using the alternative lift-plate assembly as partially illustrated in FIG. 11. In this figure, like numerals indicate like parts. To the underside of the lower plate 98 is secured a plate 156 of magnetic material such as iron. Desirably, this plate 156 is a permanent magnet with one surface 158 being of one polarity and the other surface 160 being of the opposite polarity. Screws 102a secure all of the plates 96, 98 and 156 together.

Figure 11:
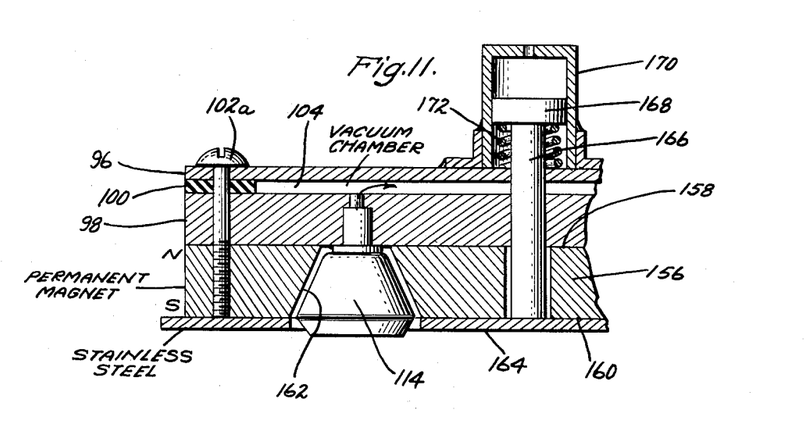
FIG. 11 is a fragmentary sectional illustration of another embodiment of the lift-plate assembly already mentioned.

The plate 156 is provided with suitable recesses 162 which loosely receive the suction cups 114, respectively, the bottom surface 160 being positioned substantially adjacent to but above the end portion of the cup.

Assembled against the surface 160 of the magnetic plate 156 is another flat plate 164 of stainless steel or some suitable nonmagnetic material. For holding this plate 164 in assembled position, one or more actuating rods 166 are secured thereto which pass upwardly through apertures in the various plates 96, 98 and 156. The upper ends of the rods 166 are secured to pistons 168 in cylinders 170, and in order to bias the pistons 168 upwardly thereby holding the plate 164 against the plate 156, helical springs are interposed between the plate 96 and the piston 168. The cylinder 170 may be mounted on the top surface of the upper plate 96. The assembly of the magnet plate 156 and the plate 164 is slightly shorter in thickness than the operative length of the suction cups, as shown in FIG. 11.

Assuming that this lift-plate assembly of FIG. 11 is substituted for the lift-plate assembly of FIG. 6, and a sheet of paper covers the tops of the cans, when the elevator assembly is brought downwardly against the tops of the cans, the magnetic plate 156 attracts and holds the cans to the lift-plate assembly. The cups 114 engage the paper and are evacuated as before.

The elevator assembly is next lifted and then swung around to a position diametrically opposite the starting position for depositing the cans on a conveyor surface or the like, this depositing function being achieved by admitting pressure fluid to the cylinder 170 for driving the piston 168 as well as the separation plate 164 downwardly away from the magnetic plate 156. This breaks the attaching force between the cans and the magnetic plate 156 allowing the layer of cans to be deposited upon the conveyor surface. However, the vacuum in the cups 114 is not disturbed, whereupon the layer of paper still adheres thereto, as the flexible paper will bridge up towards the opening, or recess 162 and the similar hole formed in the plate 164. The apparatus is then operated to swing the elevator assembly back 90° toward the starting position. In this location, the vacuum to the cups 114 is released, and if necessary air pressure is introduced into the chamber 104 which serves to blow the paper away from the cups. Thus, the manual step of removing the paper from the layers of cans in a particular stack is eliminated entirely.

Figure 5:
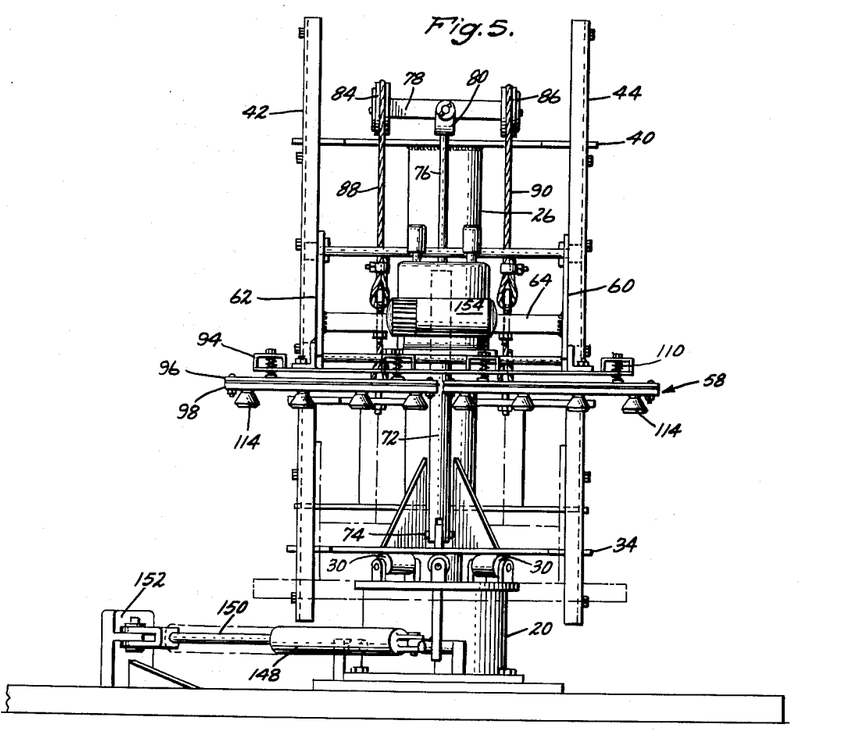
FIG. 5 is a front elevational view of the embodiment of FIG. 1.

An important feature of the present invention is the fact that the apparatus as viewed in FIGS. 1 and 5 is usually designed to have an overall height which closely approximates ordinary ceiling height. This means, therefore, that the upper end of the piston rod 76 and the pulleys 84 and 86 should never exceed the fixed height of the machine, because otherwise the pulleys might contact the ceiling and could not rise high enough to obtain maximum elevation of the elevator assembly 58. By means of the pulley cable arrangement already described, the elevator assembly 58 may be moved from floor to machine-height level while the upper end of the piston rod 76 moves only half the distance and not beyond the fixed height of the machine.

While we have described above the principles of our invention in connection with specific apparatus, it is to be clearly understood that this description is made only by way of example and not as a limitation to the scope of our invention.

What is claimed is:

1. Apparatus of the character described comprising a stationary base having an upright cylindrically shaped supporting post mounted thereon, a tubular supporting column telescoped over and coaxially rotatably mounted on said post, a horizontally extending bearing plate on the lower end of said column, a circumferential series of supporting rollers on said stationary base and engaged by said bearing plate for vertically and rotatably supporting said column, two vertically spaced horizontally extending flat mounting plates carried by said column on the upper portion thereof, two elongated upright spaced-apart and parallel guide members secured to said mounting and bearing plates for rotation with said column, each guide member having two parallel spaced-apart and longitudinally extending tracks, a lifting-power cylinder having opposite ends and a reciprocal piston rod, said cylinder being upright and intermediate said guide members, the lower end of said cylinder being pivotally mounted on said bearing plate, said piston rod projecting through and coaxially beyond the upper end of said cylinder, a horizontal crossbar pivotally secured intermediate its ends to the upper end of said piston rod, said crossbar being disposed between and extending in a direction from one guide member toward the other, two pulleys mounted on the outer ends, respectively, of said cross-bar for rotation about horizontal axes; an elevator assembly comprising two spaced-apart parallel flat supporting plates which are vertically arranged and disposed adjacent to said two guide members, respectively, a horizontal bar secured to its opposite end portions to said two supporting plates, respectively, said supporting plates each having two vertically spaced pairs of rollers, the rollers of each pair being horizontally spaced and engageable with the aforesaid two tracks, respectively, two cables passed over said two pulleys respectively and connected at one end thereof to one of said mounting plates and at the other end to the last-mentioned horizontal bar, two horizontal spaced-apart and parallel suspension bars fixedly secured to said supporting plates and extending therebetween, two flat horizontal spaced-apart and parallel lift plates spaced immediately beneath said suspension bars, a vacuum-sealing member engaged by and interposed between said lift plates around the marginal edges of the latter for providing a sealed vacuum chamber between said lift plates, a plurality of spaced-apart bolts movably passing through said suspension bars and having heads engageable with the upper surfaces of said suspension bars, respectively, said bolts being secured to said lift plates, helical compression springs surrounding said bolts, respectively, and being engageable at the opposite ends thereof with said suspension bars and the upper lift plate, respectively, a plurality of horizontally spaced rubber suction cups secured to the underside of the lower lift plate, said suction cups having cup-shaped interiors which open downwardly, a plurality of valve bodies, there being one valve body for each suction cup, each valve body having opposite ends with one end being secured to said lower lift plate and the other end projecting beneath said lower lift plate, each suction cup being secured to said other end of said valve body, a passage through said valve body communicating at one end with the chamber between said lift plates and at the other end with the interior of the respective suction cup, a valve cavity in each valve body intermediate the ends of and joining said passage, a valve seat provided at the juncture of said passage and the upper portion of said cavity, a ball valve in said cavity and engageable with said valve seat to close the same, and a conduit connected to said chamber for evacuating the same.

2. Apparatus of the character described comprising a stationary base having an upright cylindrically shaped supporting post mounted thereon, a tubular supporting column telescoped over and coaxially rotatably mounted on said post, a horizontally extending bearing plate on the lower end of said column, a circumferential series of supporting rollers on said stationary base and engaged by said bearing plate for vertically and rotatably supporting said column, two vertically spaced horizontally extending flat mounting plates carried by said column on the upper portion thereof, two elongated upright spaced apart and parallel guide members secured to said mounting and bearing plates for rotation with said column, each guide member having two parallel spaced-apart and longitudinally extending tracks, a lifting-power cylinder having opposite ends and a reciprocable piston rod, said cylinder being upright and intermediate said guide members, the lower end of said cylinder being pivotally mounted on said bearing plate, said piston rod projecting through and coaxially beyond the upper end of said cylinder, a horizontal crossbar pivotally secured intermediate its ends to the upper end of said piston rod, said crossbar being disposed between and extending in a direction from one guide member toward the other, two pulleys mounted on the outer ends, respectively, of said crossbar for rotation about horizontal axes; an elevator assembly comprising two spaced-apart parallel flat supporting plates which are vertically arranged and disposed adjacent to said two guide members, respectively, a horizontal bar secured to its opposite end portions to said two supporting plates, respectively, said supporting plates each having two vertically spaced pairs of rollers, the rollers of each pair being horizontally spaced and engageable with the aforesaid two tracks, respectively, two cables passed over said two pulleys respectively and connected at one end thereof to one of said mounting plates and at the other end to the last-mentioned horizontal bar, two flat horizontal spaced-apart and parallel lift plates secured to said supporting plates, a vacuum-sealing member engaged by and interposed between said lift plates around the marginal edges of the latter for providing a sealed vacuum chamber, a plurality of horizontally spaced rubber suction cups secured to the underside of the lower lift plate, said suction cups having cup-shaped interiors which open downwardly, a plurality of valve bodies, there being one valve body for each suction cup, each valve body having opposite ends with one end being secured to said lower lift plate and the other end projecting beneath said lower lift plate, each suction cup being secured to said other end of said valve body, a passage through said valve body communicating at one end with the chamber between said lift plates and at the other end with the interior of the respective suction cup, a valve cavity in each valve body intermediate the ends of and joining said passage, a valve seat provided at the juncture of said passage and the upper portion of said cavity, a ball valve in said cavity and engageable with said valve seat to close the same, and a conduit connected to said chamber for evacuating the same.

3. Apparatus of the character described comprising a stationary base having an upright cylindrically shaped supporting post mounted thereon, a tubular supporting column telescoped over and coaxially rotatably mounted on said post, a horizontally extending bearing plate on the lower end of said column, a circumferential series of supporting rollers on said stationary base and engaged by said bearing plate for vertically and rotatably supporting said column, two vertically spaced horizontally extending flat mounting plates carried by said column on the upper portion thereof, two elongated upright spaced-apart and parallel guide members secured to said mounting and bearing plates for rotation with said column, each guide member having two parallel spaced-apart and longitudinally extending tracks, a lifting-power cylinder having opposite ends and a reciprocable piston rod, said cylinder being upright and intermediate said guide members, the lower end of said cylinder being pivotally mounted on said bearing plate, said piston rod projecting through and coaxially beyond the upper end of said cylinder, a horizontal crossbar pivotally secured intermediate its ends to the upper end of said piston rod, said crossbar being disposed between and extending in a direction from one guide member toward the other, two pulleys mounted on the outer ends, respectively, of said crossbar for rotation about horizontal axes; an elevator assembly comprising two spaced-apart parallel flat supporting plates which are vertically arranged and disposed adjacent to said two guide members, respectively, a horizontal bar secured to its opposite end portions to said two supporting plates, respectively, said supporting plates each having two vertically spaced pairs of rollers, the rollers of each pair being horizontally spaced and engageable with the aforesaid two tracks, respectively, two cables passed over said two pulleys respectively and connected at one end thereof to one of said mounting plates and at the other end to the last-mentioned horizontal bar, two flat horizontal spaced-apart and parallel lift plates secured to said supporting plates, a vacuum-sealing member engaged by and interposed between said lift plates around the marginal edges of the latter for providing a sealed vacuum chamber, a plurality of horizontally spaced rubber suction cups secured to the underside of the lower lift plate, means for connecting said vacuum chamber with the interior of said suction cups, and means for closing the connection between said chamber and ones of said suction cups which do not have the interiors thereof sealed from the atmosphere.

4. Apparatus of the character described comprising a stationary base having an upright cylindrically shaped supporting post mounted thereon, a tubular supporting column telescoped over and coaxially rotatably mounted on said post, a horizontally extending bearing plate on the lower end of said column, a circumferential series of supporting rollers on said stationary base and engaged by said bearing plate for vertically and rotatably supporting said column, two vertically spaced horizontally extending flat mounting plates carried by said column on the upper portion thereof, two elongated upright spaced-apart and parallel guide members secured to said mounting and bearing plates for rotation with said column; an elevator assembly comprising two spaced-apart parallel flat supporting plates which are vertically arranged and disposed adjacent to said two guide members, respectively, means securing said supporting plates together and mounting them for vertical movement on said guide members, two horizontal spaced-apart and parallel suspension bars fixedly secured to said supporting plates and extending therebetween, two flat horizontal spaced-apart and parallel lift plates spaced immediately beneath said suspension bars, a vacuum-sealing member engaged by and interposed between said lift plates around the marginal edges of the latter for providing a sealed vacuum chamber between said lift plates, a plurality of spaced-apart bolts movably passing through said suspension bars and having heads engageable with the upper surfaces of said suspension bars, respectively, said bolts being secured to said lift plates, helical compression springs surrounding said bolts, respectively, and being engageable at the opposite ends thereof with said suspension bars and the upper lift plate respectively, a plurality of horizontally spaced rubber suction cups secured to the underside of the lower lift plate, said suction cups having cup-shaped interiors which open downwardly a plurality of valve bodies, there being one valve body for each suction cup, each valve body having opposite ends with one end being secured to said lower lift plate and the other end projecting beneath said lower lift plate, each suction cup being secured to said other end of said valve body, a passage through said valve body communicating at one end with the chamber between said lift plates and at the other end with the interior of the respective suction cup, a valve cavity in each valve body intermediate the ends of and joining said passage; a valve seat provided at the juncture of said passage and the upper portion of said cavity, a ball valve in said cavity and engageable with said valve seat to close the same, and a conduit connected to said chamber for evacuating the same.

5. Apparatus of the character described comprising a stationary base having an upright cylindrically shaped supporting post mounted thereon, a tubular supporting column telescoped over and coaxially rotatably mounted on said post, a horizontally extending bearing plate on the lower end of said column, a circumferential series of supporting rollers on said stationary base and engaged by said bearing plate for vertically and rotatably supporting said column, two vertically spaced horizontally extending flat mounting plates carried by said column on the upper portion thereof, two elongated upright spaced-apart and parallel guide members secured to said mounting and bearing plates for rotation with said column, an elevator assembly comprising two spaced-apart parallel flat supporting plates which are vertically arranged and disposed adjacent to said two guide members, respectively, means mounting said elevator assembly on said guide members for vertical movement, two flat horizontal spaced-apart and parallel lift plates secured to said supporting plates, a vacuum-sealing member engaged by and interposed between said lift plates around the marginal edges of the latter for providing a sealed vacuum chamber, a plurality of horizontally spaced rubber suction cups secured to the underside of the lower lift plate, said suction cups having cup-shaped interiors which open downwardly, a plurality of valve bodies, there being one valve body for each suction cup, each valve body having opposite ends with one end being secured to said lower lift plate and the other end projecting beneath said lower lift plate, each suction cup being secured to said other end of said valve body, a passage through said valve body communicating at one end with the chamber between said lift plates and at the other end with the interior of the respective suction cup, a valve cavity in each valve body intermediate the ends of and joining said passage, a valve seat provided at the juncture of said passage and the upper portion of said cavity, a ball valve in said cavity and engageable with said valve seat to close the same, and a conduit connected to said chamber for evacuating the same.

6. Apparatus of the character described comprising a stationary base having an upright cylindrically shaped supporting post mounted thereon, a tubular supporting column telescoped over and coaxially rotatably mounted on said post, a horizontally extending bearing plate on the lower end of said column, a circumferential series of supporting rollers on said stationary base and engaged by said bearing plate for vertically and rotatably supporting said column, two vertically spaced horizontally extending flat mounting plates carried by said column on the upper portion thereof, two elongated upright spaced-apart and parallel guide members secured to said mounting and bearing plates for rotation with said column, an elevator assembly comprising two spaced-apart parallel flat supporting plates which are vertically arranged and disposed adjacent to said two guide members, respectively, means mounting said elevator assembly on said guide members for vertical movement, two flat horizontal spaced-apart and parallel lift plates secured to said supporting plates, a vacuum-sealing member engaged by and interposed between said lift plates around the marginal edges of the latter for providing a sealed vacuum chamber, a plurality of horizontally spaced resilient suction cups secured to the underside of the lower lift plate, means for connecting said vacuum chamber with the interior of said suction cups, and means for closing the connection between said chamber and ones of said suction cups which do not have the interiors thereof sealed from the atmosphere.

7. Apparatus of the character described comprising a stationary support, a supporting frame rotatably mounted on said support for rotation about a vertical axis, two elongated upright spaced-apart and parallel guide members carried by said frame, each guide member having two parallel spaced-apart and longitudinally extending tracks, a lifting-power cylinder having opposite ends and a reciprocable piston rod, said cylinder being upright and intermediate said guide members, the lower end of said cylinder being mounted on said supporting frame, said piston rod projecting through and coaxially beyond the upper end of said cylinder, a horizontal crossbar pivotally secured intermediate its ends to the upper end of said piston rod for movement in a vertical plane, said crossbar being disposed between and extending in a direction from one guide member toward the other, two pulleys mounted on the outer ends, respectively, of said crossbar for rotation about horizontal axes; an elevator assembly comprising two spaced-apart parallel flat supporting plates which are vertically arranged and disposed adjacent to said two guide members, respectively, a horizontal bar secured to its opposite end portions to said two supporting plates, respectively, a horizontal bar secured to its opposite end portions to said two supporting plates, respectively, said supporting plates each having two vertically spaced pairs of rollers, the rollers of each pair being horizontally spaced and engageable with the aforesaid two tracks, respectively, two cables passed over said two pulleys respectively and connected at one end thereof to one of said mounting plates and at the other end to the last-mentioned horizontal bar, two flat horizontal spaced-apart and parallel lift plates secured to said supporting plates, a vacuum-sealing member engaged by and interposed between said lift plates around the marginal edges of the latter for providing a sealed vacuum chamber, a plurality of horizontally spaced resilient suction cups secured to the underside of the lower lift plate, means for connecting said vacuum chamber with the interior of said suction cups, and means for closing the connection between said chamber and ones of said suction cups which do not have the interiors thereof sealed from the atmosphere.

8. Apparatus of the character described comprising a pair of flat spaced-apart plates which are secured together and which have a hermetically sealed chamber therebetween, a plurality of spaced-apart plastic suction cups secured to the outer surface of one of said plates, a plurality of passages through said one plate providing communication between said chamber and the interiors of said cups, respectively, a flat plate of magnetic material secured to said one plate, said magnetic plate having a plurality of recesses which receive said cups, respectively, the open ends of said cups opening outwardly through the outer surface of said magnetic plate, a separation plate mounted in parallelism with and adjacent to the outer surface of said magnetic plate, said separation plate and said magnetic plate being of a total thickness less than the depth of said cups, said separation plate having a plurality of apertures therein which receive, respectively, the open-end portions of said cups, at least one actuating rod movably passing transversely through the aforesaid pair and magnetic plates and connected at one end to said separation plate, whereby axial movement of said rod serves to move said separation plate relative to said magnetic plate.

9. Apparatus of the character described comprising a plate of magnetic material having opposite surfaces, said plate having a plurality of spaced-apart recesses which open through one of said surfaces, a plurality of resilient plastic suction cups, means mounting said suction cups in said recesses, respectively, with the open-end portions thereof opening outwardly of said one surface, a separation plate mounted in parallelism with and adjacent to said one surface, said separation plate having a plurality of apertures therein which loosely receive, respectively, the open-end portions of said cups and normally have said portions extending therebelow, and means connected to said separation plate to force it away from said one surface but at most only a short distance beyond said portions.

10. Apparatus of the character described comprising a stationary base having an upright cylindrically shaped supporting post mounted thereon, a tubular supporting column telescoped over and coaxially rotatably mounted on said post, means operatively positioned on said stationary base and engaging said column for vertically and rotatably supporting it, two elongated upright spaced-apart and parallel guide members operatively secured to said column for rotation therewith, an elevator assembly comprising two spaced-apart parallel flat supporting members which are vertically arranged and disposed adjacent to said two guide members; means mounting said elevator assembly on said guide members for controlled vertical movement thereon, means for moving said elevator assembly connected thereto, two flat horizontal spaced-apart and parallel lift plates secured to and extending between said supporting members, a vacuum-sealing member engaged by and interposed between said lift plates around the marginal edges of the latter for providing a sealed vacuum chamber, a plurality of horizontally spaced plastic suction cups secured to the underside of the lower lift plate, means for connecting said vacuum chamber with the interior of said suction cups, and means for closing the connection between said chamber and ones of said suction cups which do not have the interiors thereof sealed from the atmosphere whereby said lift plates can be lowered to engage said suction cups with articles and then said lift plates can be moved vertically and said elevator assembly can be rotated with said column about said post.

11. Apparatus of the character described comprising a stationary base having an upright cylindrically shaped supporting post mounted thereon, a tubular supporting column telescoped over and coaxially rotatably mounted on said post, means operatively positioned on said stationary base and engaging said column for vertically and rotatably supporting it, two elongated upright spaced-apart and parallel guide members operatively secured to said column for rotation therewith, an elevator assembly comprising a frame disposed between said two guide members, means mounting said elevator assembly on said guide members for controlled vertical movement thereon, means for moving said elevator assembly vertically, a vacuum chamber member secured to said frame, a plurality of horizontally spaced plastic suction cups secured to the underside of said member, means connecting said vacuum chamber of said member with the interior of said suction cups, and means for closing the connection between said chamber and ones of said suction cups which do not have the interiors thereof sealed from the atmosphere whereby apparatus is provided for controlled movement of said elevator assembly in both vertical and arcuate directions.

12. Apparatus of the character described comprising a stationary support, a supporting frame rotatably mounted on said support for rotation about a vertical axis, two elongated upright spaced-apart and parallel guide members carried by said frame, each guide member having two parallel spaced-apart and longitudinally extending tracks, a lifting-power cylinder having a reciprocable piston rod, said cylinder being upright and intermediate said guide members, the lower end of said cylinder being operatively mounted on said frame, said piston rod projecting through and coaxially beyond the upper end of said cylinder, a horizontal crossbar pivotally secured intermediate its ends to the upper end of said piston rod, said crossbar being disposed between and extending in a direction from one guide member toward the other, two support members mounted on the outer ends, respectively, of said crossbar for rotation about horizontal axes; an elevator assembly comprising an elevator frame which is vertically arranged and disposed between said two guide members; a plurality of rollers journalled on said elevator frame and engaging the said two tracks of said guide member for controlled vertical movement of said elevator frame, two flexible members passed over said two support members, respectively, and connected at one end thereof to said supporting frame and at the other end to the said elevator frame at laterally spaced portions thereof for support and limited tilting movement of said elevator frame, a vacuum chamber forming means carried by said elevator assembly at the lower portion thereof, a plurality of horizontally spaced rubber suction cups secured to the underside of said chamber forming means and connected with the interior thereof, said suction cups each having a downwardly and inwardly inclined lip thereon, and means for closing the connection between said chamber forming means and ones of said suction cups which do not have the interiors thereof sealed from the atmosphere.

13. Apparatus of the character described comprising a stationary support, a supporting frame rotatably mounted on said support for rotation about a vertical axis, two elongated upright spaced-apart and parallel guide members carried by said frame, a lifting-power cylinder having a reciprocable piston rod, said cylinder being upright and intermediate said guide members, the lower end of said cylinder being operatively mounted on said frame, said piston rod projecting up beyond the upper end of said cylinder, a horizontal crossbar secured intermediate its ends to the upper end of said piston rod for pivotal movement in a vertical plane, said crossbar being disposed between and extending in a direction of from one guide member toward the other, two support members mounted on the outer ends, respectively, of said crossbar for rotation about horizontal axes; an elevator assembly comprising an elevator frame which is vertically arranged and disposed between said two guide members; a plurality of rollers journalled on said elevator frame and engaging said guide member for controlled vertical movement of said elevator frame, two flexible members passed over said two support members, respectively, and connected at one end thereof to said supporting frame and at the other end to the said elevator frame at laterally spaced portions thereof for support of and limited tilting movement of said elevator frame, a vacuum chamber forming means carried by said elevator assembly at the lower surface thereof, a plurality of horizontally spaced plastic suction cups secured to the underside of said chamber forming means and connected with the vacuum chamber thereof, and means for closing the connection between said chamber forming means and ones of said suction cups which do not have the interiors thereof sealed from the atmosphere by engagement with an article to be lifted.

14. Apparatus of the character described comprising a carrier, a lift plate means having a sealed vacuum chamber formed therein, means mounting said lift plate means on said carrier for limited movement vertically with respect thereto, a plurality of horizontally spaced plastic suction cups secured to the underside of said lift plate means, said suction cups having substantially flat base portions and cup-shaped interiors which open downwardly and terminate in downwardly and inwardly inclined lips and are shaped to produce internal stresses therein, a plurality of valve bodies, there being one valve body for each suction cup, each valve body having opposite ends with one end being secured to said lift plate means, means including a lock member securing each suction cup to said other end of a said valve body and engaging the base of said suction cup to force it towards said lift plate means to retain said suction cup of said shape, said valve body having a passage therein communicating at one end with the chamber in said lift plate means and at the other end with the interior of the respective suction cup, valve means in each said valve body to close a said passage when the suction cup connecting thereto is not sealed from the atmosphere, and a conduit connected to said vacuum chamber for evacuating the same.

15. Apparatus of the character described comprising a carrier, a lift plate means having a sealed vacuum chamber formed therein, means mounting said lift plate means on said carrier for limited movement vertically with respect thereto, a plurality of horizontally spaced resilient plastic suction cups secured to the underside of said lift plate means, said suction cups having base portions and cup-shaped interiors which open downwardly and terminate in downwardly and inwardly inclined lips, a plurality of valve bodies, there being one valve body for each suction cup, each valve body having opposite ends with one end being secured to said lift plate means, means including a member engaging the base of each said suction cup to secure it to said other end of said valve body and to force said base against an operative portion of said lift plate means, a said valve body having a passage communicating at one end with the chamber in said lift plate means and at the other end with the interior of the respective suction cup, valve means in each said valve body to close said passage when the suction cup connecting thereto is not sealed from the atmosphere, and a conduit connected to said vacuum chamber for evacuating the same.

16. Apparatus of the character described comprising a stationary base having an upright cylindrically shaped supporting post mounted thereon, a tubular supporting column telescoped over and coaxially rotatably mounted on said post, means operatively positioned on said stationary base and engaging said column for vertically and rotatably supporting it, two elongated upright spaced-apart and parallel guide members operatively secured to said column for rotation therewith, an elevator assembly comprising a frame disposed adjacent said two guide members, means mounting said elevator assembly on said guide members for controlled vertical movement thereon, means connected to and extending between said support column and said elevator assembly for moving said elevator assembly vertically, and can engaging means positioned on said elevator assembly whereby apparatus is provided for movement of said elevator assembly in both vertical and arcuate directions, which elevator assembly may carry a plurality of cans or other articles therewith.

17. Apparatus of the character described comprising a stationary support, a supporting frame rotatably mounted on said support for rotation about a vertical axis, two elongated upright spaced-apart and parallel guide members carried by said frame, each guide member having two parallel spaced-apart and longitudinally extending tracks, a lifting-power cylinder having a reciprocable piston rod, said cylinder being upright and intermediate said guide members, the lower end of said cylinder being operatively mounted on said frame, said piston rod projecting through and coaxially beyond the upper end of said cylinder, a horizontal crossbar pivotally secured intermediate its ends to the upper end of said piston rod, said crossbar being disposed between and extending in a direction from one guide member toward the other, two support members mounted on the outer ends, respectively, of said crossbar for rotation about horizontal axes; an elevator assembly comprising an elevator frame which is vertically arranged and disposed between said two guide members; a plurality of rollers journalled on said elevator frame and engaging the said two tracks of said guide member for controlled vertical movement of said elevator frame, two flexible members passed over said two support members, respectively, and connected at one end thereof to said supporting frame and at the other end to the said elevator frame at laterally spaced portions thereof for support of said elevator frame, and can engaging means carried by said elevator frame at a lower portion thereof for releasable engagement with a plurality of horizontally aligned cans.

18. Apparatus of the character described comprising a stationary support, a supporting frame rotatably mounted on said support for rotation about a vertical axis, two elongtaed upright spaced-apart and parallel guide members carried by said frame, a lifting-power cylinder having a reciprocable piston rod, said cylinder being upright and intermediate said guide members, the lower end of said cylinder being operatively mounted on said frame, said piston rod projecting up beyond the upper end of said cylinder, a horizontal crossbar secured intermediate its ends to the upper ends of said piston rod for pivotal movement in a vertical plane, said crossbar being disposed between and extending in a direction of from one guide member toward the other, two support members mounted on the outer ends, respectively, of said crossbar for rotation about horizontal axes; an elevator assembly comprising an elevator frame which is vertically arranged and disposed between said two guide members; a plurality of rollers journalled on said elevator frame and engaging said guide member for controlled vertical movement of said elevator frame, two flexible members passed over said two support members, respectively, and connected at one end thereof to said supporting frame and at the other end to the said elevator frame at laterally spaced portions thereof for support of said elevator frame, and releasable can engaging means secured to said elevator frame.

19. Apparatus of the character described comprising a stationary support, a supporting frame mounted on said support for rotation about a vertical axis, two elongated upright spaced-apart and parallel guide members carried by said frame, a lifting-power cylinder having a reciprocable piston rod, said cylinder being upright and intermediate said guide members, a horizontal crossbar positioned between said guide members, two support members mounted in spaced relation on said crossbar for rotation about horizontal axes; an elevator assembly comprising an elevator frame which is disposed adjacent and positioned for vertical movement on said two guide members; a plurality of rollers journalled on said elevator frame and operatively engaging said guide members for controlled vertical movement of said elevator frame, two flexible members passed over said two support members, respectively, and connected at one end to said supporting frame and at the other end to said elevator frame at laterally spaced portions thereof for support of said elevator frame; said cylinder and piston rod being secured to and extending between said frame and said crossbar for raising and lowering said elevator frame, means connecting between said frame and said stationary support for controlled arcuate movement of said supporting frame, and can engaging means carried by said elevator frame at a lower portion thereof for controlled and releasable engagement with a plurality of horizontally aligned cans or similar articles.

20. Apparatus of the character described comprising a stationary support, a supporting frame mounted on said support for rotation about a vertical axis, two elongated upright spaced-apart and parallel guide members carried by said supporting frame, a lifting-power cylinder having a reciprocable piston rod, said cylinder being upright and intermediate said guide members, a horizontal crossbar postiioned between said guide members, a support member mounted on said crossbar for rotation about a horizontal axis; an elevator assembly comprising an elevator frame which is disposed adjacent and positioned for vertical movement on said two guide members; a flexible member passed over said support member and connected at one end to said supporting frame and at the other end to said elevator frame for support of said elevator frame; said cylinder and piston rod being secured to and extending between said supporting frame and said crossbar for raising and lowering said elevator frame, means connecting between said supporting frame and said stationary support for controlled arcuate movement of said supporting frame, and article engaging means carried by said elevator frame at a lower portion thereof for controlled and releasable engagement with a plurality of horizontally aligned articles.

References Cited by the Examiner

UNITED STATES PATENTS

| 1,089,274 | 3/14 | Sazenhofen. | |
| 2,466,693 | 4/49 | Fischer | 214—309 |
| 2,656,060 | 10/53 | Fischer | 214—309 |
| 2,668,602 | 2/54 | Cushman | 214—731 |
| 2,798,757 | 7/57 | Jackson | 294—64 |
| 2,803,485 | 8/57 | Page | 294—65 |
| 2,887,849 | 5/59 | Lytle | 294—64 |
| 2,897,988 | 8/59 | Enock | 214—309 |
| 2,903,290 | 9/59 | Morris | 294—65 |
| 2,960,364 | 11/60 | Herzog | 294—65 |
| 2,966,995 | 1/61 | Steinle | 214—309 |

HUGO O. SCHULZ, *Primary Examiner.*